United States Patent
Breneman et al.

(10) Patent No.: US 7,131,499 B2
(45) Date of Patent: *Nov. 7, 2006

(54) COMBINATION LINE TRIMMER AND EDGER

(75) Inventors: Matthew R. Breneman, Lawrenceville, GA (US); John P. Leffler, Alpharetta, GA (US); James F. Hutfles, Jacksonville, FL (US)

(73) Assignee: Original Power, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/865,801

(22) Filed: Jun. 14, 2004

(65) Prior Publication Data

US 2005/0060976 A1 Mar. 24, 2005

Related U.S. Application Data

(63) Continuation of application No. 10/135,930, filed on Apr. 29, 2002, now Pat. No. 6,769,494.

(60) Provisional application No. 60/287,364, filed on Apr. 30, 2001.

(51) Int. Cl.
*A01D 34/84* (2006.01)
(52) U.S. Cl. .......................... 172/14; 56/12.7
(58) Field of Classification Search ................ 56/12.7; 172/13, 14, 15
See application file for complete search history.

(56) References Cited

U.S. PATENT DOCUMENTS

| | | | | |
|---|---|---|---|---|
| 5,603,205 A | * | 2/1997 | Foster | 56/16.7 |
| 5,669,101 A | * | 9/1997 | Aiyama et al. | 16/436 |
| 5,867,911 A | * | 2/1999 | Yates et al. | 30/276 |
| 5,933,966 A | * | 8/1999 | Yates et al. | 30/276 |
| 6,260,278 B1 | * | 7/2001 | Faher | 30/276 |
| 6,301,866 B1 | * | 10/2001 | Marshall et al. | 56/233 |
| 6,439,088 B1 | * | 8/2002 | Eytchison et al. | 83/13 |
| 6,460,319 B1 | * | 10/2002 | Marshall et al. | 56/233 |
| 6,516,598 B1 | * | 2/2003 | Notaras et al. | 56/16.7 |
| 6,604,349 B1 | * | 8/2003 | Deal | 56/12.7 |

* cited by examiner

*Primary Examiner*—Meredith C. Petravick
*Assistant Examiner*—Alexandra Pechhold
(74) *Attorney, Agent, or Firm*—McKenna Long & Aldridge LLP

(57) ABSTRACT

An improved line trimmer and edging unit for lawn and garden use provides a multi-position accessory handle, a roller edge guide having a flange concentrically located about the motor shaft and being of sufficient diameter to maintain a consistent distance between the cutting plane and the object being edged around, symmetrically disposed safety switches, and a battery located symmetrically in-line with the center of the shaft of the unit. The combination lawn trimmer and edger unit may be used in a first, horizontal cutting plane position for lawn and weed trimming, and may be further used in a second, vertical cutting plane position for edging.

5 Claims, 9 Drawing Sheets

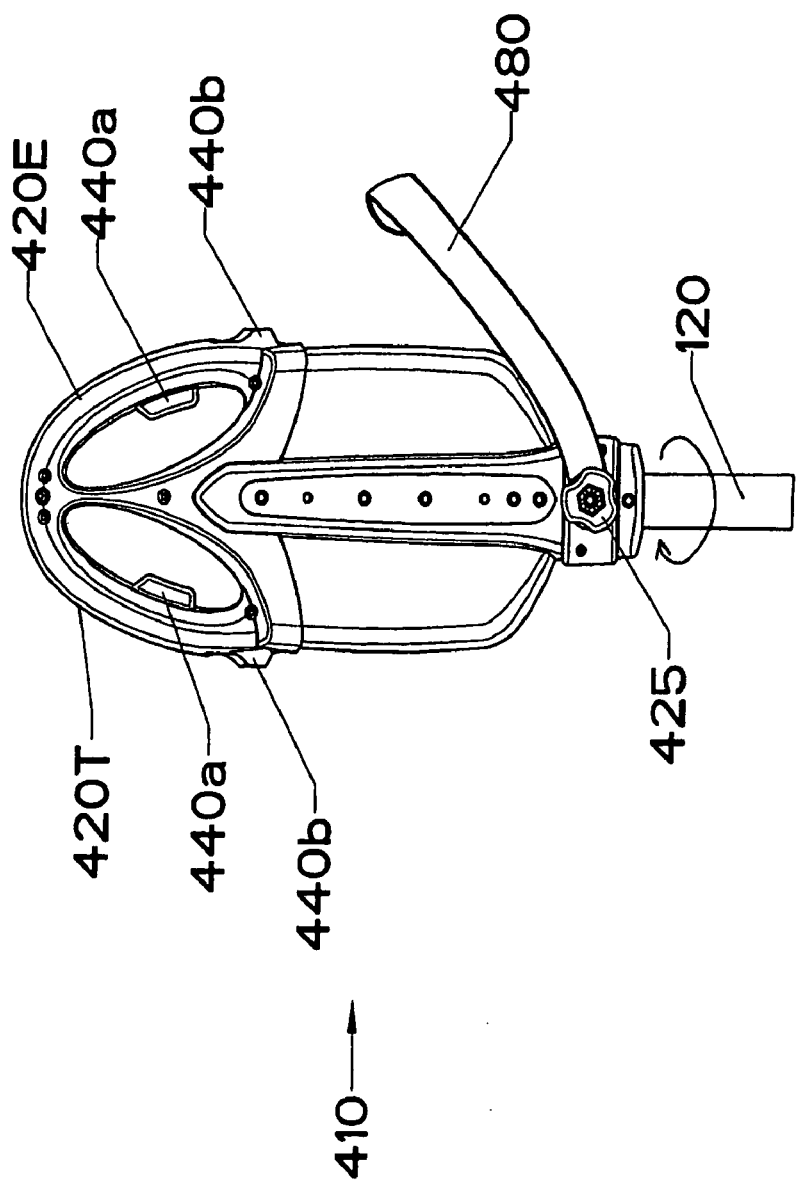

COMBINATION LINE TRIMMER AND EDGER

CROSS-REFERENCE TO RELATED APPLICATIONS

This application is a continuation of prior application Ser. No. 10/135,930, filed Apr. 29, 2002, now U.S. Pat. Ser. No. 6,769,494.

The inventors hereof claim the benefit of U.S. provisional patent application Ser. No. 60/287,364 filed Apr. 30, 2001.

TECHNICAL FIELD

The present invention relates, generally, to improved line trimmer and edging devices for lawn and garden use; and, more specifically, to a combination line trimmer and edging device, further providing, in a preferred embodiment, a multi-position handle, a roller edge guide with a flange concentrically located about the motor shaft, dual-position safety switches symmetrically located about the central shaft of the unit; and, a battery pack located symmetrically in-line with the center of the shaft of the unit.

BACKGROUND

For many years, powered line or blade-type trimmers have been offered for the trimming and weeding of lawns in the horizontal plane. Similarly, powered edgers have been offered for the cutting of lawns away from walkways and driveways in the vertical plane.

Consumers, in their desire to purchase and utilize only one tool for these equivalent lawn cutting purposes, have attempted to use trimmers of the aforementioned type, intended for use in a horizontal position for grass and weed cutting purposes, in a rotated, vertical plane to function as a lawn edger.

Most of these units have a control handle, containing the power switches, and an accessory handle, for additional support of the unit's weight and for use in maneuvering the unit in use. Disadvantageously, however, due to the designs of these handles, many units are not convenient or safe to use in such a way. Often only a single accessory handle position is provided, optimized for use in the lawn cutting horizontal plane. Accordingly, when the device is held in the edging position, the accessory handle is generally in an inconvenient and off-balance position.

Further contributing to the inconvenience in use of such devices in the vertical plane edging position, the on/off switch and the activation trigger has been located in an inconvenient position. A switch or trigger that is not in a convenient position raises the dual concerns that the device might be started by accident, resulting in a device that is both difficult to use and unsafe, or might be difficult to stop in an emergency situation.

Recent units have been developed that make it more convenient and comfortable for the operator of the unit to more easily hold the unit in the required vertical edging position. Some such units have devices provided for the rotation of the trimmer head about its shaft, in effect allowing rotation of the cutting plane. Often, however, such rotation devices are cumbersome and inconvenient to use.

For edging use, in addition to the issue of maintaining an adequate control position, devices have been developed to help guide the trimmer with a consistent motion, so as to give the trimmed edge a neat appearance. Many such devices of this type comprise wheel-and-bracket arrangements, rubbing pads, or wire guide loops, configured to hold the trimmer at a relatively uniform height.

Many such devices have been developed to safely hold the trimmer in an edging position, and to guide the trimmer in a linear motion, so as to give the trimmed edge a neat appearance. Most of these are of an A-frame type, with wheels mounted on the frame and the frame clamped to the shaft of the trimmer. Some of these types of devices allow the user to loosen the clamp and rotate the trimmer into an edger position. U.S. Pat. No. 4,922,694 to Emoto and U.S. Pat. No. 5,450,715 to Murray are examples of this kind of device. Some of these devices, such as U.S. Pat. No. 4,224,784 to Hansen et al. have the wheels rotated 90 degrees to function as an edge guide. Still other designs have plates clamped to the shaft which held wheels in an edging configuration, such as in U.S. Pat No. 4,981,012 to Claborn. Other devices, such as U.S. Pat. No. 5,228,276 to Miller, are merely axles which bolt to the trimmer.

Through the additional use of a vertical-plane feature in association with these devices, the orientation of the cutting plane to the adjacent vertical curbing surface can be controlled in a more consistent manner. Unfortunately, these devices are sometimes unwieldy to install, to use, and to store. Such devices do not provide a single tool solution to the problem identified by many consumers.

It is, therefore, readily apparent that there is a need for a, new and improved combination line trimmer and edging device, further providing, in a preferred embodiment, two equally-convenient operating and control positions, a flanged roller edge guide, and dual-action safety switches symmetrically located about the shaft of the device; and, in an alternate embodiment, the above features including a battery located symmetrically in-line with the center of the shaft of the device.

It is, therefore, to the provision of such an improved device that the present invention is directed.

BRIEF SUMMARY OF THE INVENTION

Briefly described, in a preferred embodiment, the present invention both overcomes the above-mentioned disadvantages, and meets the recognized needs for such a unit, by providing a line trimmer unit with an operating and control position that changes easily from a position convenient for trimming, to one that is convenient for edging.

The unit, accordingly, is provided preferably with two sets of actuation and safety switches which, through their symmetrical location about the control handle of the unit, and when used in association with the multi-position accessory handle and control handle of the unit, allow the operator to easily flip or rotate the unit into a second operating position (from trimming mode to edging mode and vice versa), and, thereby, to maintain the controls in the exact same position with respect to the operator. In this manner, the convenience to, and safety of, the operator is optimized in either position.

In edging mode, a flanged roller edge guide that is preferably integral to the trimmer housing assembly assists the operator in creating a uniformly-trimmed edge, and eliminates the need for complicated appendages or techniques to perform this function. Advantageous to the present invention, the roller edge guide is integral to the trimmer housing assembly is and concentrically located about the motor shaft. Because of this orientation, the roller edge guide can be of sufficient diameter to allow easy rolling on most surfaces, while maintaining a consistent distance between the cutting plane and the object being edged, regardless of the angular orientation of the trimmer with respect to the operator or the working plane.

In a preferred embodiment, the power source (e.g., a battery) for the unit is located in a symmetrical, in-line orientation with respect to the shaft of the unit. This orientation serves to ease the rotation of the unit between control positions, and also facilitates a consistent feel during use in either of the two modes (trimming and edging) of operation. This consistency of feel is manifested in the way that the mass of the power source affects the operational maneuverability of the unit. Accordingly, in either position the unit is equally well balanced.

Thus, it is an object of the present invention to provide a new and improved combination line trimmer and edger that has a multi-position accessory handle which may be easily indexed amongst positions.

It is another object of the present invention to provide a new and improved combination line trimmer and edger that has opposed, symmetrical motor actuation and safety switches.

It is a further object of the present invention to provide a new and improved combination line trimmer and edger that has an edging roller with a flange that is integral to the trimmer housing, which operates to assist the operator in creating a distinct trimmed edge, and which eliminates the need for complicated apparatus to perform this function.

It is yet a further object of the present invention to provide a new and improved combination line trimmer and edger wherein the roller edge guide is integral to the trimmer housing and concentrically located about the motor shaft, and whereby the roller edge guide is of sufficient diameter to allow easy rolling on most surfaces, while maintaining a consistent distance between the cutting plane and the object be edged around.

It is still a further object of the present invention to provide a new and improved combination line trimmer and edger with a battery located symmetrically in-line with the center of the shaft of the unit.

It is yet a further object of the present invention to provide a new and improved combination line trimmer and edger which may easily be used as a conventional trimmer, intended for use in a horizontal position for grass and weed cutting purposes, and then rotated into a vertical plane to function as a lawn edger, all while providing secure and convenient control of the unit in either such position, along with a balanced aspect and safe operation.

Other objects, features, and advantages of the present invention will become apparent to those ordinarily skilled in the art by reference to the accompanying Drawing Figures and to the Detailed Description of the Preferred Embodiment presented herein.

BRIEF DESCRIPTION OF THE FIGURES

The present invention will be better understood by reading the Detailed Description of the Preferred Embodiment with reference to the accompanying drawing Figures, in which like reference numerals denote similar structure and refer to like elements throughout, and in which.

DETAILED DESCRIPTION OF THE PREFERRED EMBODIMENTS

Figure 1:
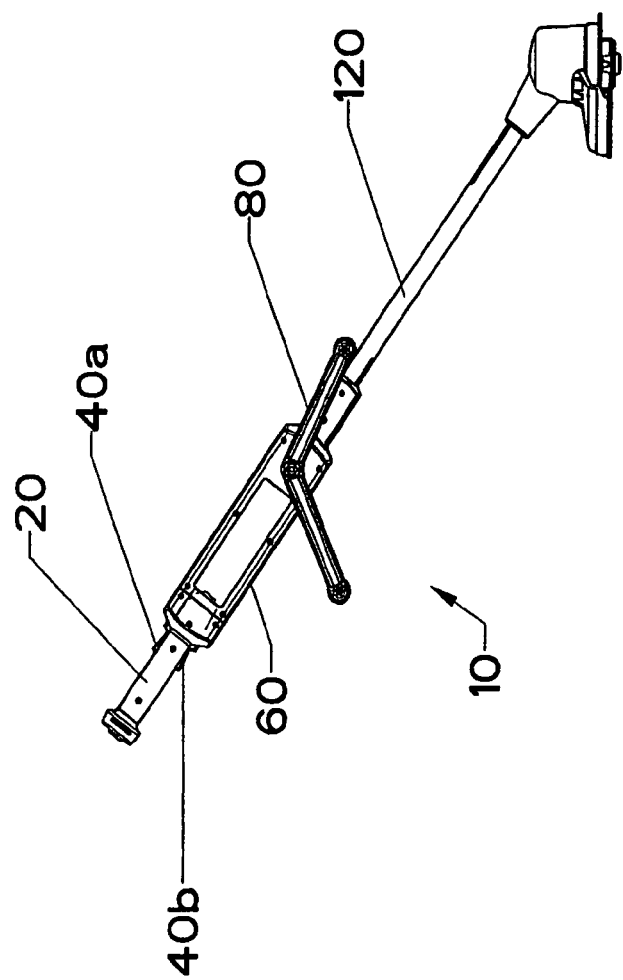
FIG. 1 is a side view of the combination lawn trimmer and edger unit of the present invention, demonstrating the handle and trimmer housing in the trimmer configuration.

In describing the preferred and alternate embodiments of the present invention illustrated in the Figures, specific terminology is employed for the sake of clarity. The invention, however, is not intended to be limited to the specific terminology so selected, and it is to be understood that each specific element includes all technical equivalents that operate in a similar manner to accomplish a similar purpose.

Shown in FIGS. 1–8 is a combination lawn trimmer and edger unit 10 of the present invention according to a first embodiment. Unit 10, generally, is provided with two sets of actuation and safety switches 40a, 40b which, through their symmetrical location about shaft 120 of unit 10, when used in association with multi-position accessory handle 80 and control handle 20 of unit 10, allow the operator to easily flip or rotate unit 10 into a second operating position (from trimming mode to edging mode and vice versa), and, thereby, to maintain the controls in the exact same position with respect to the operator. In this manner, the convenience to, and safety of, the operator is optimized in either position.

Figure 2:
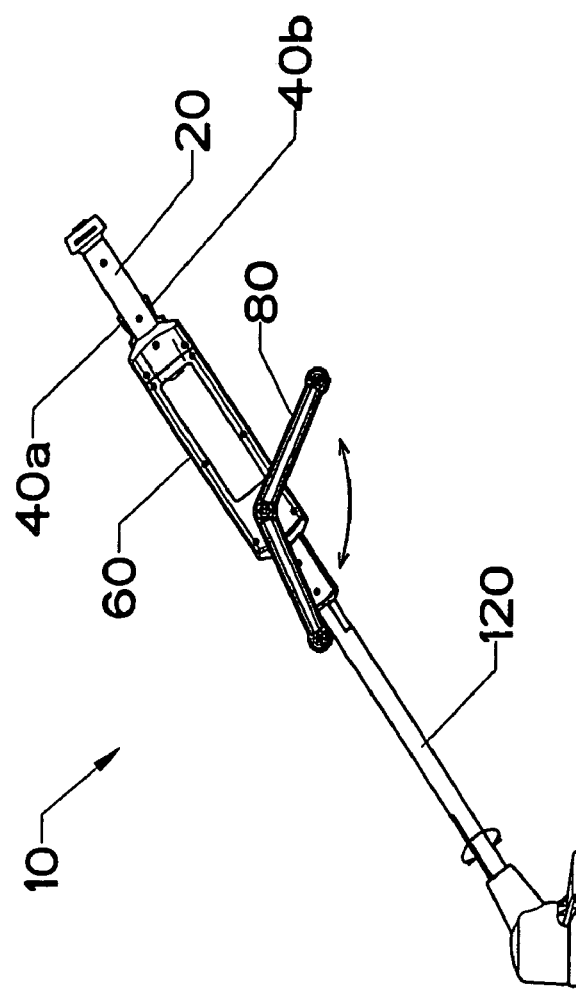
FIG. 2 is a side view of the combination lawn trimmer and edger unit of the present invention, demonstrating the handle and trimmer housing in the edger configuration.
Figure 3:
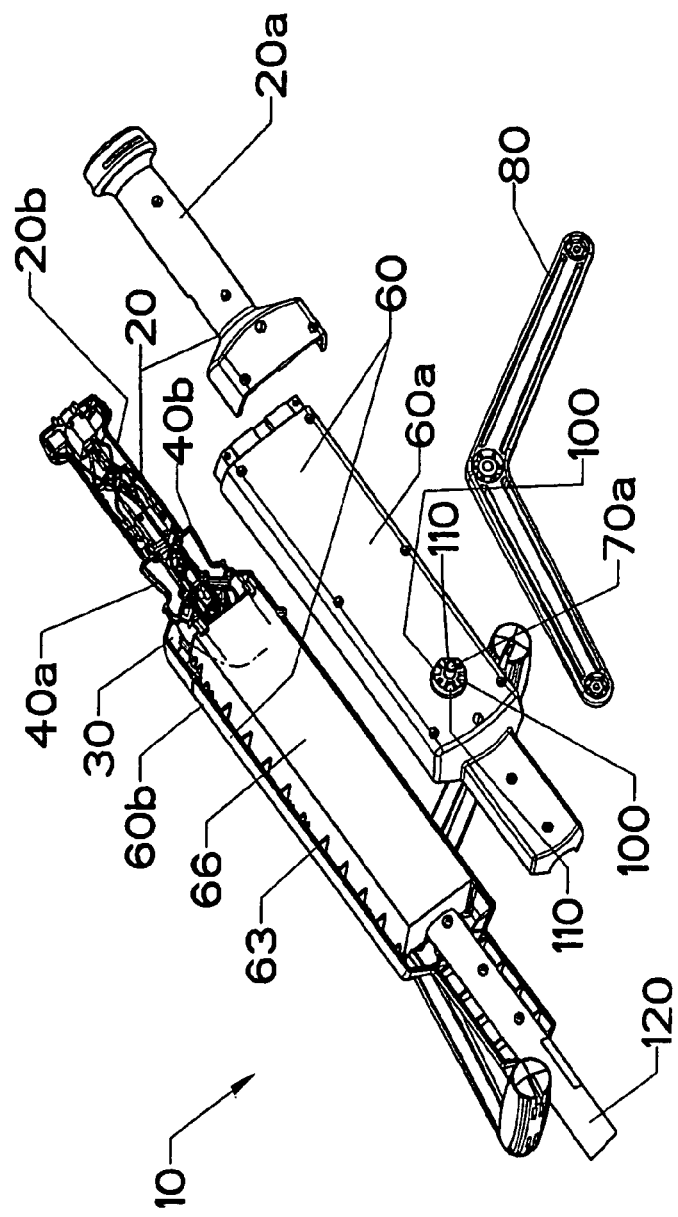
FIG. 3 is an exploded perspective view of the handgrip, handle, and battery housing of the combination lawn trimmer and edger unit of the present invention.

Specifically, with first reference to FIGS. 1–3, unit 10 generally comprises control handle 20, which is formed in two halves 20a, 20b. Integrally molded retainers 30 within control handle 20 retain two switches 40a, 40b. Halves 20a, 20b of control handle 20 are fastened together, which results in switches 40a, 40b being captured in place.

Switches 40a, 40b are located symmetrically about shaft 120 of unit 10. This arrangement will be seen to allow the operator of unit 10 easily to rotate unit 10 about the axis of shaft 120; thereby, resulting in switches 40a, 40b advantageously being in the same control position relative to the operator, and eliminating the necessity of being required to hold the trimmer in an attitude that would cause unsafe or unmanageable operation.

Switches 40a, 40b are of a safety lockout type. In order for unit 10 to function, one switch 40a, 40b must be in the enable, trigger-lock release mode, whereupon the other switch 40a, 40b then acts like a conventional, trigger-type on/off switch. These functions are reversed upon rotation of unit 10, so that a trigger 40a, 40b is always in the most convenient position for the operator, regardless of whether unit 10 is being used in the trimmer operating position or in the edger operating position. Accordingly, so long as one switch 40a, 40b is in the enable mode and the other switch has the trigger engaged, unit 10 will function.

Control handle 20 is connected at its lower end to the upper end of battery housing 60. Battery housing 60 is also preferably formed in two halves 60a, 60b, which are fastened together. Integrally molded battery positioning retainers 63 hold battery 66 in place. Battery 66 preferably comprises an elongated configuration and is positioned within unit 10 so as to give unit 10 optimal operational balance. Because battery 66 is symmetrically located in-line with the center-line of shaft 120, the user easily may rotate unit 10 between and amongst its two operating positions.

Battery housing halves 60a, 60b further comprise pivot pins 70a, 70b for accessory handle 80. As best seen with reference to FIGS. 7 and 8, pivot pins 70a, 70b preferably are molded or otherwise affixed into battery housing halves 60a, 60b. Accessory handle 80 simply snaps over pivot pins 70a, 70b.

Accessory handle 80 is held in an operator selected position by tapered locating cams 90, which engage a first set of slots 100 on battery housing 60. A relatively small amount of force is all that is required to index accessory handle 80 to a second position. Once accessory handle 80 has been indexed into its second position, tapered locating cams 90 then engage a second set of slots 110, which hold accessory handle 80 in its second position.

The lower end of battery housing 60 is fastened to the upper end of shaft 120.

Figure 4:
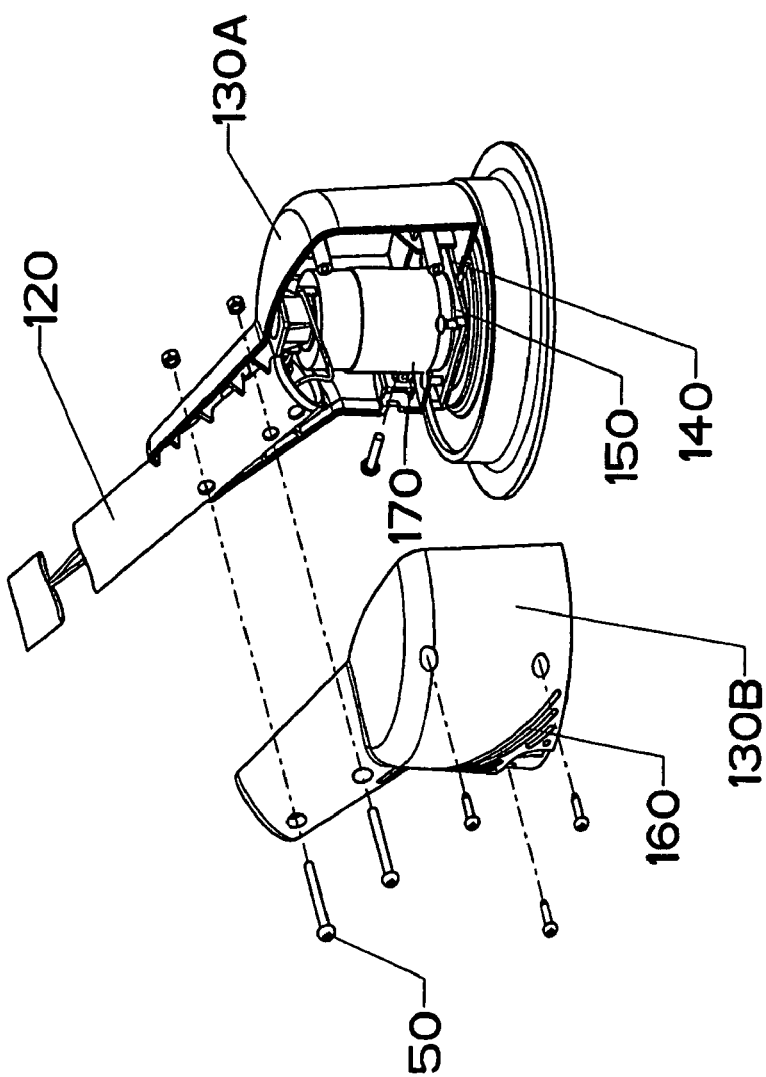
FIG. 4 is an exploded perspective view of the shaft, trimmer housing, roller edge guide, and motor assembly of the combination lawn trimmer and edger unit of the present invention.

Referring next to FIG. 4, lower end of shaft 120 is affixed to the upper end of trimmer housing 130. Trimmer housing 130 preferably is formed in two halves 130a, 130b, which are fastened together. Integrally molded retainers 140 within two halves 130a, 130b of the trimmer housing 130 hold motor mounting plate 150 in position. Openings 160 are provided to permit air to flow freely to motor assembly 170 for cooling.

Figure 5:
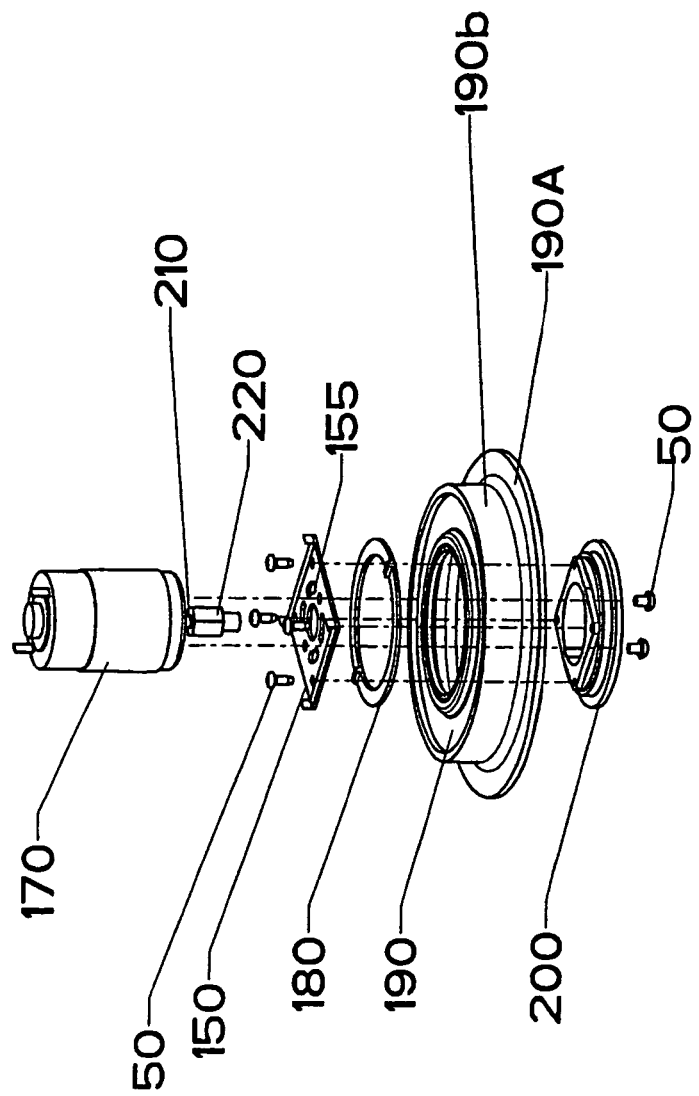
FIG. 5 is an exploded perspective view of the roller edge guide and motor assembly of the combination lawn trimmer and edger unit of the present invention.

Referring next to FIG. 5, motor mounting plate 150 is provided with openings 155 to permit affixation and mounting of motor assembly 170. Accordingly, motor assembly 170 is affixed to the upper side of motor mounting plate 150. The upper side of flange washer 180 contacts the lower side of motor mounting plate 150. The upper side of edging roller 190 contacts the lower side of flange washer 180. Bottom flange 200 contacts lower side of edging roller 190, and is affixed to the lower side of motor mounting plate 150. In such position, bottom flange 200 holds flange washer 180 and edging roller 190 in position, yet allows edging roller 190 to freely rotate. Flange area 190a of edging roller 190 contacts the ground or other working surface and allows the operator to maintain a uniform edge when unit 10 is used in the edging position.

Advantageous to the present invention, edging roller 190 is integral to trimmer housing 130 and is concentrically located about motor shaft 210. Edging roller 190 is of sufficient diameter to allow easy rolling on most surfaces, while maintaining a consistent distance between the cutting plane and the object be edged around.

Accordingly, in edging mode, flanged edging roller 190 assists the operator in creating a uniformly-trimmed edge, while eliminating the need for complicated ancillary devices or techniques to perform this function. Because of the previously described orientation, flanged edging roller 190 can be of sufficient diameter to allow easy rolling on most surfaces, while maintaining a consistent distance between the cutting plane and the object being edged, regardless of the angular orientation of the trimmer with respect to the operator or the working plane.

It will be seen that motor shaft 210 extends through motor mounting plate 150, flange washer 180, edging roller 190, and bottom flange 200. Upper end of motor coupling 220 is attached to the end of motor shaft 210.

Figure 6:
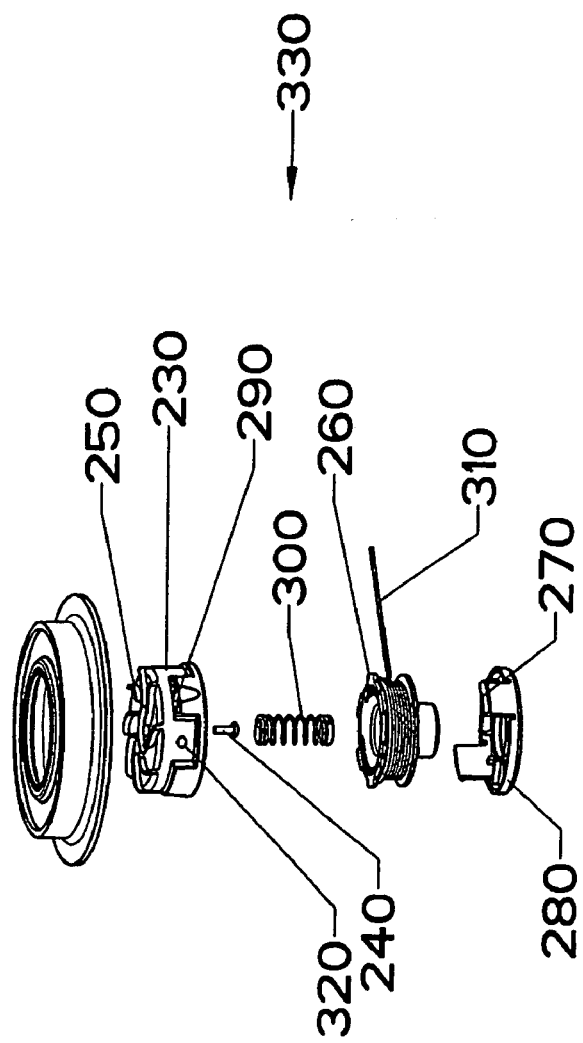
FIG. 6 is an exploded perspective view of the roller edge guide and linehead assembly of the combination lawn trimmer and edger unit of the present invention.
Figure 7:
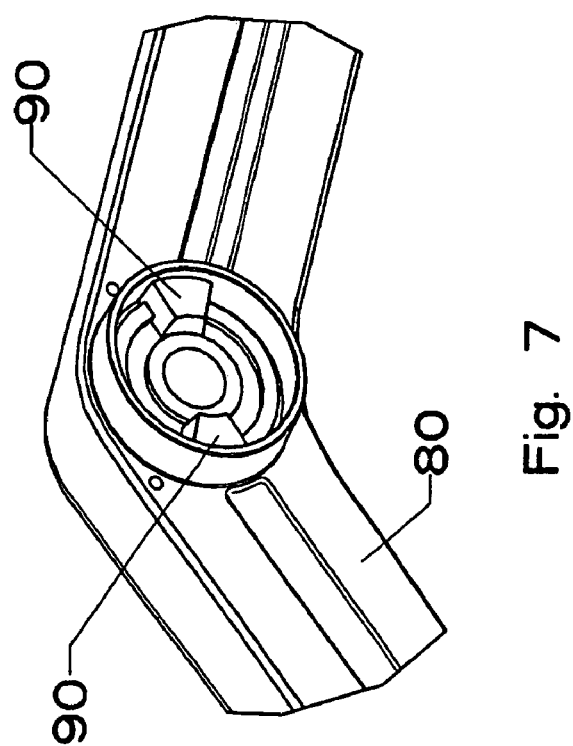
FIG. 7 is a perspective view of the handle of the combination lawn trimmer and edger unit of the present invention, showing the tapered locating cams of the handle of the unit.
Figure 8:
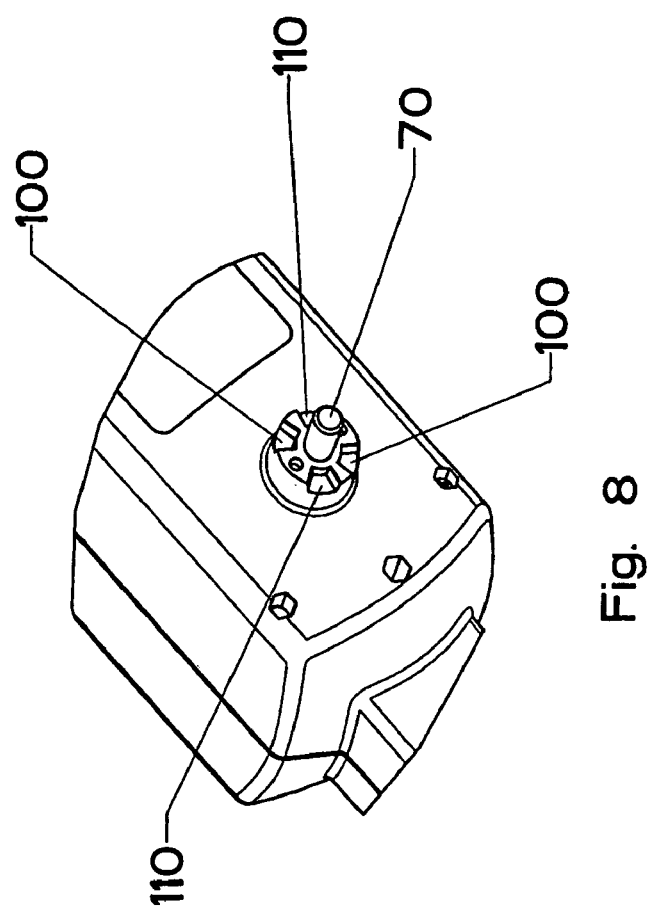
FIG. 8 is a perspective view of the handle pivot pin and locating slots of the combination lawn trimmer and edger unit of the present invention; and, FIG. 9 is a perspective view of an alternate embodiment of the combination lawn trimmer and edger unit of the present invention showing the handle, switches, and thumb screws.

Referring now to FIG. 6, linehead housing 230 overlies lower end of motor coupling 220 and is held in place by screw 240. Upper side of linehead housing 230 has fan blades 250, preferably integrally molded therein to provide airflow to cool motor assembly 170. Linehead spool 260 slips into linehead housing 230 and is held in place by tabs 270 on the side of linehead cover 280, which further engage slots 290 in linehead housing 230. Spring 300 is provided between linehead spool 260 and linehead housing 230, in order to bias linehead spool 260 against linehead cover 280.

Line 310, which is used as the preferred cutting means, is wrapped about linehead spool 260 and is then extended through hole 320 in linehead housing 230. Linehead housing 230, spring 300, linehead spool 260, linehead cover 280, and screw 240, accordingly, are seen to comprise linehead assembly 330.

When motor 170 is energized, linehead assembly 330 rotates, causing line 310 to revolve about the axis of linehead spool 260. Spinning line 310 may then be advanced by the user of unit 10 into the lawn area which is to be trimmed.

In operation, with unit 10 configured for use as a trimmer, the operator grasps accessory handle 20 and control handle 80. Switch 40a, located upon the top of unit 10 is depressed by the operator's thumb. Switch 40b, located upon the bottom of unit 10 is used as a conventional trigger-type switch, and is depressed by the operator's index finger. Both switches 40a, 40b must be depressed for unit 10 to operate. When linehead assembly 330 begins spinning, unit 10 may be moved from side-to-side in a sweeping motion, and is thereafter advanced into the lawn area to be trimmed.

When the operator desires to use unit 10 as an edger, all that is necessary is for the user to index accessory handle 80 into the edging position and then rotate unit 10 by 180 degrees. Switches 40a, 40b are operated as discussed hereinabove, their respective functions, however, being reversed. Since switches 40a, 40b are dual-acting, switch 40a is now engaged by the operator's thumb, and switch 40b is now on the bottom to be used as a conventional trigger-type switch. Both switches must be depressed, however, in order for unit 10 to operate.

In the edger position, when linehead housing 230 starts spinning, the user rests circular area 190b of edging roller 190 upon a horizontally-oriented feature of an area to be edged. Flange 190a of edging roller 190 contacts a vertically-oriented feature of the area to be edged and acts to guide unit 10, which results in a uniformly trimmed edge.

Referring next to FIG. 9, in an alternate embodiment designated unit 410, accessory handle 480 rotates on shaft 120 and is held in the respective operating position by a standard detent mechanism of a type well-known in the art. To change operating positions, the operator simply rotates accessory handle 480 about the axis of shaft 120 from a first operating position to the second operating position. The angle of accessory handle 480 may be adjusted with respect to shaft 120 for maximum operator comfort by loosening thumbscrews 425, moving accessory handle 480 to the desired position, and re-tightening thumbscrews 425.

Both the edging and trimming operating positions have first switch 440a for actuation and second switch 440b for safety lockout purposes. Switches 440a, 440b are contained in control handle 420. Control handle 420 may comprise two symmetrical control handles designated 420t, 420e such that in either operating position, the operator holds the exact same structure. Accordingly, switches 440a, 440b are in the same control position relative to the user in either operating position. In order for unit 410 to function, one of actuation switches 440a and its paired safety lockout switch 440b must both be engaged.

In operation, with unit 410 configured for use as a trimmer, the operator grasps control handle 420t and accessory handle 480. Switch 440b, located on the outer portion of control handle 420t, is depressed by the operator's thumb. Switch 440a, located on the inner portion of control handle 420t, is used as a conventional trigger-type switch, and is depressed by the operator's index finger. Both switches 440a, 440b must be depressed for unit 410 to operate. When linehead assembly 330 begins spinning, unit 410 may be moved from side-to-side in a sweeping motion, and is thereafter advanced into the lawn area to be trimmed.

When the operator desires to use unit 410 as an edger, all that is necessary is for the operator to rotate accessory handle 480 into the edging position and to rotate unit 410 by 180 degrees. The operator then grasps control handle 420e. The opposing set of switches 440a, 440b are operated as described hereinabove. Once again, both switches 440a, 440b must be engaged in order for unit 410 to operate.

In the edger position, when linehead housing 230 begins spinning, the user rests circular area 190b of edging roller 190 upon a horizontally-oriented feature of an area to be edged. Flange 190a of edging roller 190 contacts a vertically-oriented feature of the area to be edged and acts to guide unit 10, which results in a uniformly trimmed edge.

It will be recognized by one ordinarily skilled in the art that the disclosures made herein with regard to battery-operated combination line trimmer and edger devices are equally applicable to devices driven by other means of motive force; including, but not limited to gasoline engines, or the like. Specifically, features comprising either individually or in combination, a multi-position accessory handle; a multi-position control handle; a roller edge guide comprising a flange of sufficient diameter to allow easy rolling while maintaining consistent distance between the cutting plane and the object being edged around; and/or, motor actuation switches symmetrically located about the control handle of the device are equally applicable to devices having non-battery powered engines.

It should also be noted that where parts are attached or fastened together they may be riveted, screwed, snapped, glued, or otherwise affixed by any other equivalent means, known in the art, to accomplish the attachment.

It should also be apparent to one ordinarily skilled in the art that alternate cutting means may be utilized in lieu of the cutting line disclosed by the above described several embodiments. Such alternate cutting means might include a blade or blades, plastic cutter or cutters, or the like.

Having thus described preferred embodiments of the present invention, it should be noted by those skilled in the art that the within disclosures are exemplary only, and that various other alternatives, adaptations, and modifications may be made within the scope of the present invention.

Accordingly, the present invention is not limited to the specific embodiments illustrated herein, but is limited only by the following claims.

We claim:

1. A combination vegetation trimmer and edger comprising:
   (a.) a motor, said motor affixed to a shaft;
   (b.) a head for carrying cutting means, said head mechanically coupled to said motor and supported by said shaft;
   (c.) at least one control handle affixed to said shaft;
   (d.) a front handle; and,
   (e.) a motor actuation mechanism positioned upon said at least one control handle and comprising at least one motor activation switch,
   whereby said combination vegetation trimmer and edger may be used in a first, horizontal cutting plane position for lawn and weed trimming, and may be further used in a second, vertical cutting plane position for edging.

2. The combination vegetation trimmer and edger of claim 1, wherein the motor actuation mechanism comprises two mechanical motor activation switches.

3. A combination vegetation trimmer and edger comprising:
   (a.) a motor, said motor affixed to a shaft;
   (b.) a head for carrying cutting means, said head mechanically coupled to said motor and supported by said shaft;
   (c.) at least one control handle affixed to said shaft;
   (d.) a front handle; and,
   (e.) a first switch and a second switch positioned upon said at least one control handle to actuate the motor,
   whereby said combination vegetation trimmer and edger may be used in a first, horizontal cutting plane position for lawn and weed trimming, and may be further used in a second, vertical cutting plane position for edging, wherein the first switch is engaged in the first position and the second switch is engaged in the second position.

4. The combination vegetation trimmer and edger of claim 3, wherein the first and second switches are mechanical switches.

5. A combination vegetation trimmer and edger comprising:
   (a.) a motor, said motor affixed to a shaft;
   (b.) a head for carrying cutting means, said head mechanically coupled to said motor and supported by said shaft;
   (c.) at least one control handle affixed to said shaft;
   (d.) a front handle; and,
   (e.) at least one mechanical switch positioned upon said at least one control handle,
   whereby said combination vegetation trimmer and edger may be used in a first, horizontal cutting plane position for lawn and weed trimming, and may be further used in a second, vertical cutting plane position for edging, wherein the at least one mechanical switch is positioned on the at least one control handle such that the combination vegetation trimmer and edger can be operated in the first and second positions.

* * * * *